US008271320B2

(12) United States Patent
Agrawal et al.

(10) Patent No.: US 8,271,320 B2
(45) Date of Patent: Sep. 18, 2012

(54) METHOD AND SYSTEM FOR ENABLING UNREGISTERED USERS TO MANAGE ELECTRONIC ITEMS ACROSS SESSIONS

(75) Inventors: Aseem Agrawal, New Delhi (IN); Natwar Modani, New Delhi (IN); Parul A Mittal, New Delhi (IN); Rajendra Sureka, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 2181 days.

(21) Appl. No.: 10/317,354

(22) Filed: Dec. 12, 2002

(65) Prior Publication Data
US 2004/0117247 A1   Jun. 17, 2004

(51) Int. Cl.
 *G06Q 30/00* (2012.01)
(52) U.S. Cl. .................. 705/14; 705/14.22; 705/14.23; 705/14.39
(58) Field of Classification Search .............. 705/14, 705/14.22, 14.23, 14.39
See application file for complete search history.

(56) References Cited

U.S. PATENT DOCUMENTS

| | | | |
|---|---|---|---|
| 5,855,007 A * | 12/1998 | Jovicic et al. | 705/14 |
| 6,321,208 B1 * | 11/2001 | Barnett et al. | 705/14 |
| 6,594,692 B1 * | 7/2003 | Reisman | 709/219 |
| 6,850,899 B1 * | 2/2005 | Chow et al. | 705/26 |
| 6,898,571 B1 * | 5/2005 | Val et al. | 705/14 |
| 6,925,444 B1 * | 8/2005 | McCollom et al. | 705/14 |
| 6,976,003 B1 * | 12/2005 | Hamor et al. | 705/14 |
| 7,010,512 B1 * | 3/2006 | Gillin et al. | 705/39 |
| 7,231,357 B1 * | 6/2007 | Shanman et al. | 705/14 |
| 7,284,258 B2 * | 10/2007 | Mineyama | 725/58 |
| 7,302,463 B1 * | 11/2007 | Shao et al. | 709/203 |
| 7,343,329 B1 * | 3/2008 | Sharp | 705/27 |
| 7,512,548 B1 * | 3/2009 | Bezos et al. | 705/26 |
| 2002/0128903 A1 * | 9/2002 | Kernahan | 705/14 |

OTHER PUBLICATIONS

M. Kumar, A. Rangachari, A. Jhingran and R. Mohan, "Sales Promotions on the Internet", Third USENIX workshop on Electronic Commerce, Boston, Aug. 31-Sep. 3, 1998, pp. 167-176.
Internet Weblink: http://www.nieropwebconsult.nl/asp_session_manager.htm?page=specs owned by Nierop Webconsultancy (NWC), The Netherlands, Amsterdam.
Internet Weblink http://www.theeducationcenter.com/cgi-bin/tec/page.jsp?NAME=Help_My_Coupons.
Internet Weblink: http://www.amazon.com.

* cited by examiner

*Primary Examiner* — Namrata Boveja
*Assistant Examiner* — Michael Goldman
(74) *Attorney, Agent, or Firm* — Gibb & Riley, LLC (57) ABSTRACT

The present invention provides a method and system for enabling an e-commerce website to persist electronic items, such as electronic coupons, gift certificates etc., across multiple browsing sessions. Users are offered electronic items over a communications network during a browsing session. In case the user wishes to save the items for a later browsing session, he/she is prompted for an email address. Details pertaining to the selected items are mapped against the email address. Thereafter, e-mail is sent to the user, containing a URL with the email address of the user embedded in it. Alternatively, entire details corresponding to the items selected during a session are embedded in the URL and in this case they need not be mapped against the email address.

12 Claims, 7 Drawing Sheets

METHOD AND SYSTEM FOR ENABLING UNREGISTERED USERS TO MANAGE ELECTRONIC ITEMS ACROSS SESSIONS

FIELD OF THE INVENTION

The present invention relates to the field of discounting and promotion of goods and services to consumers over a communications network. More particularly, it relates to managing of electronic items such as electronic coupons, gift certificates, shopping cart content etc. used in electronic commerce.

BACKGROUND OF THE INVENTION

Coupons serve as an effective sales promotion tool in the shopping world. They have long been distributed by manufacturers for marketing their products and by retail stores for attracting consumers to their stores. A coupon can be used for managing inventory, attracting new buyers, increasing market share for a particular product, rewarding customer loyalty, matching competitor's coupon campaign etc. For decades, advertisers have issued or published printed coupons that can be taken to a redemption center, such as a retail store, and redeemed for some value or as a discount towards purchase of certain item.

The evolution of online shopping over the Internet has led to extension of the concept of coupons for use in electronic commerce. Such coupons, used for e-commerce transactions, are known as electronic coupons (e-coupons). Electronic coupons are similar in purpose and operation to traditional coupons. A typical electronic coupon may contain various details such as a coupon serial number, expiry date, product information, benefit description etc. The benefit description could be discount offered on a particular product purchased, or any other special offer.

Electronic coupons can be distributed in a variety of ways. Two such techniques are distribution through banner advertisements and distribution through e-mail. Once an electronic coupon has been offered to the user (by displaying a banner or through e-mail), the user has the option of either ignoring it, or accepting it for purchases.

In case of distributing electronic coupons through e-mail, a user (usually an online shopper) is sent an email containing a specific code that can be used to redeem discount on items in an e-commerce site. The code could be in the form of a hyperlink or plain text. The user can accept the coupon by inputting the code at the site of the manufacturer/retailer, in case of plain text. In case of hyperlink, the user can accept the coupon by simply clicking the hyperlink.

Banner advertisements are also used to offer electronic coupons. A banner advertisement is a graphic or image used in web pages for advertising on the Internet. Details regarding discount on certain items are displayed on the banner advertisements. The user can accept a coupon by clicking on the banner.

Once the user has accepted electronic coupons, he/she can use them for purchasing articles on an e-commerce site. The user can go to the appropriate e-commerce site, which sells the relevant articles (for which the coupon is offered). During or at the end of the transaction, the user can provide appropriate coupon details (such as coupon ID) to get the discount or free gift. The website then offers the discount/free gift, after verifying the coupon code and the applicability conditions.

Problems arise when a user has accepted a number of such coupons. The user has to keep track of codes and applicability conditions of the electronic coupons he/she has accepted. Further, suitable coupon details need to be provided on redemption of a coupon. This can be cumbersome for users, especially in the case of large number of electronic coupons.

To alleviate the problems associated with handling large number of electronic coupons, electronic coupon wallets have been proposed. One such electronic coupon wallet is described in the reference "Sales Promotions on the Internet", M. Kumar, A. Rangachari, A. Jhingran and R. Mohan, Third USENIX workshop on electronic Commerce, Boston, 31 Aug-3 Sept. 1998. The wallet makes the handling and use of electronic coupons easier by allowing storing and viewing the accepted coupons associated with a user. Also, the wallet automatically determines the applicable coupons from a shopper's set of coupons, when a user visits the relevant site. Applicable coupons refer to those electronic coupons, which can be used for a given product or category or for the entire shopping cart of the user.

Electronic coupon wallets are stored either by the issuer or by a third party service provider. To use these wallets, a registration of users might be necessary. The registration process includes asking the user his/her name, login id, password, contact details etc. The registration makes it easy for the system to uniquely identify the users and thus preserve coupon and wallet details across sessions. The wallet functionality is implemented by associating the selected electronic coupons with the user's id. This facilitates electronic coupons accessed in one browsing session to be remembered and maintained in future sessions.

In case of unregistered users visiting an e-commerce site, it is difficult to uniquely identify or track users. This makes it difficult to offer electronic coupon wallets to unregistered users. Some sites offer electronic coupon wallets to unregistered users also, by assigning a temporary ID to them during a session. However, the ID and the associated coupons get purged once the shopper ends the session. Thus, the electronic coupons earned during one session cannot be retained for use in future browsing sessions. In other words, unregistered users visiting the website again will not be able to access their earlier wallet and corresponding coupons. This may result in unsatisfactory user experience and may, therefore, prevent users from accepting electronic coupons in future.

Since a large percentage of users accessing an e-commerce site are unregistered users, providing good user experience to unregistered users is important. The user may not like to register due to many reasons like privacy concerns, amount of effort involved in registering etc. However, from a business point of view, providing good user experience to unregistered users can lead to repeat visits and more visitors to the e-commerce site. This can significantly increase the popularity and revenues of manufacturers/retailers.

Various methods are proposed in the existing art that offer and manage electronic coupons. Many e-commerce sites such as http://www.amazon.com offer electronic coupons. Some of these restrict the e-coupon facility to registered users, while others also offer it to unregistered users. Some sites like http://www.theeducationcenter.com/cgi-bin/tec/pagejsp?NAME=Help_My_Coupons also offer electronic coupon wallets to registered users. However, none of the websites mentioned above have mechanisms to maintain electronic coupon wallets across different sessions for unregistered users.

One major problem that web sites face, while preserving electronic coupons and wallets across sessions for unregistered users, relates to identifying unregistered users uniquely. There exist methods that could be used to identify or track unregistered users across sessions. A common technique used for preserving sessions is through the use of cookies. A cookie is information that a website puts on the user's computer so that it can remember details about a user when the user revisits the website. In case of electronic coupons, cookies can be used to store details about the user and coupons. Thus when the user revisits the website, the web server can identify the user and provide him/her with the earlier electronic coupon wallet. However, this technique is specific to the user machine. Since the cookie is stored locally on the user's computer, the user won't be able to access his/her wallet from another PC. Also, in case of multiple users sharing the same PC, another user may access electronic coupons accepted by one user. Further, access to the wallet and coupons are not possible if the cookies are disabled or deleted from the user machine.

Some websites (like www.nieropwebconsult.nl/asp_session_manager.htm? page=specs) offer reentrant sessions (re-establishing an earlier user's session) by e-mail. If a user wants to continue a current browsing session in future, he/she is asked for his/her e-mail address. The system then sends an e-mail containing a session ID corresponding to the current session. When the user revisits the site, his/her earlier session is restored. Although the system can be used to preserve sessions of electronic coupon wallets also, it has certain drawbacks. The entire data regarding the session is stored on the server. This occupies a lot of space on the server. Also, since the entire session is saved, details pertaining to the user are also stored thereby developing privacy and security concerns to the user.

In the light of above discussion, there is a need for a system and method for enabling users to manage electronic coupons across multiple browsing sessions, without the user having to register onto the website offering the electronic coupons.

SUMMARY

An object of the present invention is to provide a system and method for enabling unregistered visitors to manage electronic coupons across multiple browsing sessions.

Another object of the present invention is to provide persistent electronic coupon wallets to unregistered users visiting an e-commerce site.

Users are presented electronic coupons in a variety of ways such as banner advertisements, e-mail etc. When a user clicks on a coupon, he/she is directed to the relevant web site. The user can browse the site, add further coupons or view/delete existing coupons during the session. During or at the end of a session, the user can save the selected coupons for use in a later session. The user is prompted for an email address in case he/she wants to save the session. An e-mail is sent to the user at the accepted email address. The email contains a URL with the email address of the user embedded in it. When the user clicks the URL, he/she is taken to the website and all the coupons saved during the previous browsing session are restored with the help of email address embedded in the URL. Alternatively, entire details corresponding to the coupons selected during the session are embedded in the URL and the details are restored once the user clicks the URL to start another browsing session. In an alternative embodiment, the invention can also be used for preserving other details corresponding to a user, such as shopping cart content, gift certificates, website customization etc., across sessions.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention provides a method that enables managing of electronic items, selected by a user through an e-commerce website, across multiple browsing sessions, without the user having to register on the website. The electronic item can be electronic coupons. The invention is equally applicable for managing other electronic items such as shopping cart content, website customization and gift certificates received. Details pertaining to the items selected during a browsing session are retained, and the user can access these on subsequent browsing sessions of the website over the Internet. Although the henceforth description is for electronic coupons, it is apparent to one skilled in the art that it is equally applicable to other electronic items such as shopping cart content, gift certificates etc.

Figure 1:
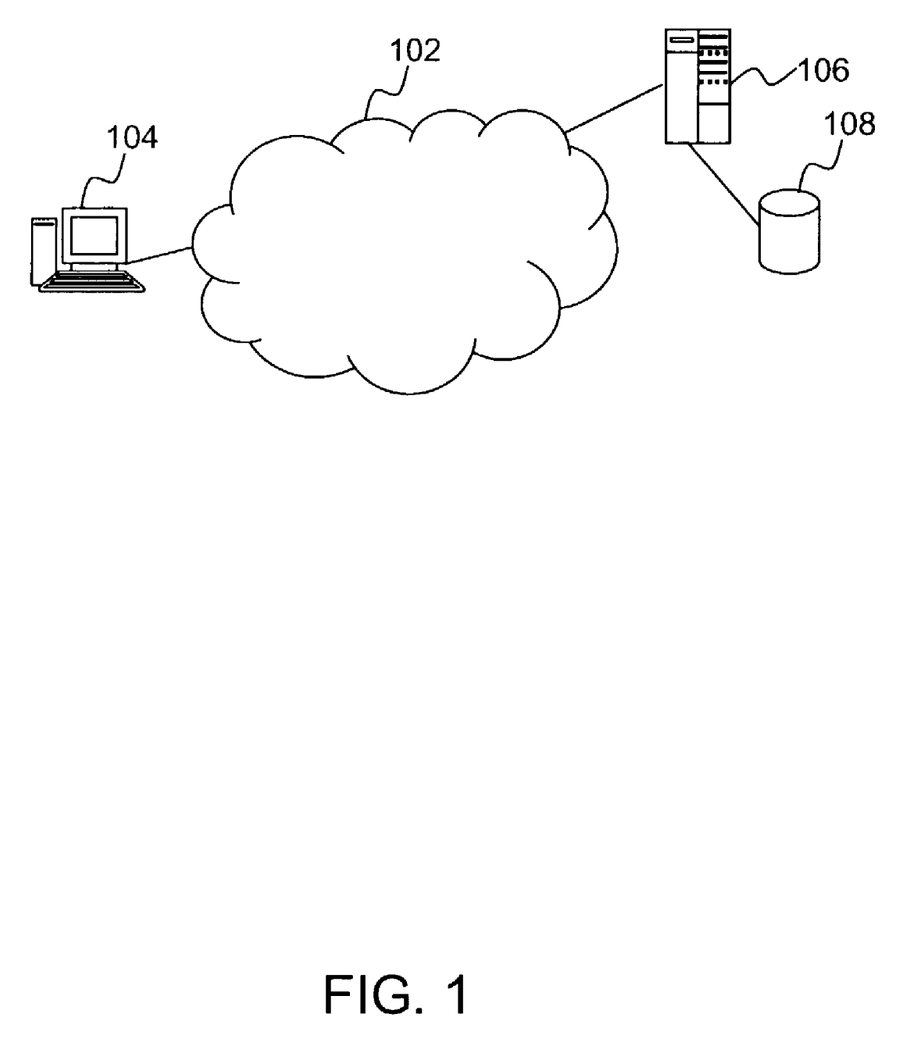
FIG. 1 shows the environment where the present invention works.

FIG. 1 shows the environment in which the present invention works. A user (an online shopper) is connected to a communication network 102 using a client machine 104. Client machine 104 has a user interface, for accessing communication network 102. Communication network 102 can be a Local Area Network (LAN), Wide Area Network (WAN), Intranet or the Internet.

Client machine 104 is preferably a personal computer of the user, and can be any commercially available personal computer such as those offered by Compaq, Hewlett Packard or IBM Corp. Alternatively, client machine 104 can be a laptop, Personal Digital Assistant (PDA) etc.

The e-commerce website enabling the current invention is preferably hosted on a webserver 106 capable of being accessed via communication network 102 by client machine 104 having a web browser provided for such a purpose. Examples of web browsers can be Microsoft® Internet Explorer or Netscape® Communicator. The web browser is installed on client machine 104. The client machine uses web browser to connect to web server 106, hosting the requested website. In the environment of the World Wide Web of the Internet, client machines effect transmission to webservers using Hyper Text Transfer Protocol (HTTP), which is a known access protocol for accessing information from the server. A Uniform Resource Locator (URL) identifies the network path to the server. Webserver 106 is also connected to a database 108. Database 108 stores data pertaining to electronic items offered by the website. In case of electronic coupons, the data can be coupon ID, expiry date, discount value, or details of the user (such as user ID) to which the coupon is offered etc.

The current invention can be implemented by a variety of means including, for example an IBM RISC System/6000 computer utilizing the AIX (Advanced Executive Version 4.1 and above) Operating System and a web server program, such as IBM Internet Connect, Secure Server (Lotus Domino), that supports interface extensions. IBM, RISC System/6000 and AIX are trademarks of IBM Corporation. The system preferably includes a graphical user interface for management and administration of the server. A representative web server is an IBM Netfinity server comprising a RISC-based processor, the AIX.RTM, an operating system and a web server program, such as Netscape® Enterprise Server. The server may also include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages (ASP), server side include (SSI) functions or the like. To implement the method provided by the current invention on a web server, standard programming tools such as ASP (a server side language developed by Microsoft® Inc. for NT servers), JavaServer Pages® (JSP®), PHP etc. can be used. Standard visual web application development environments such as Microsoft® Visual InterDev® can also be used for developing software for the current invention. Although, the above-mentioned systems can be used, it is apparent to one skilled in the art that any other hardware/operating systems and web server application program combination can be used without deviating from the scope of the invention.

Figure 2:
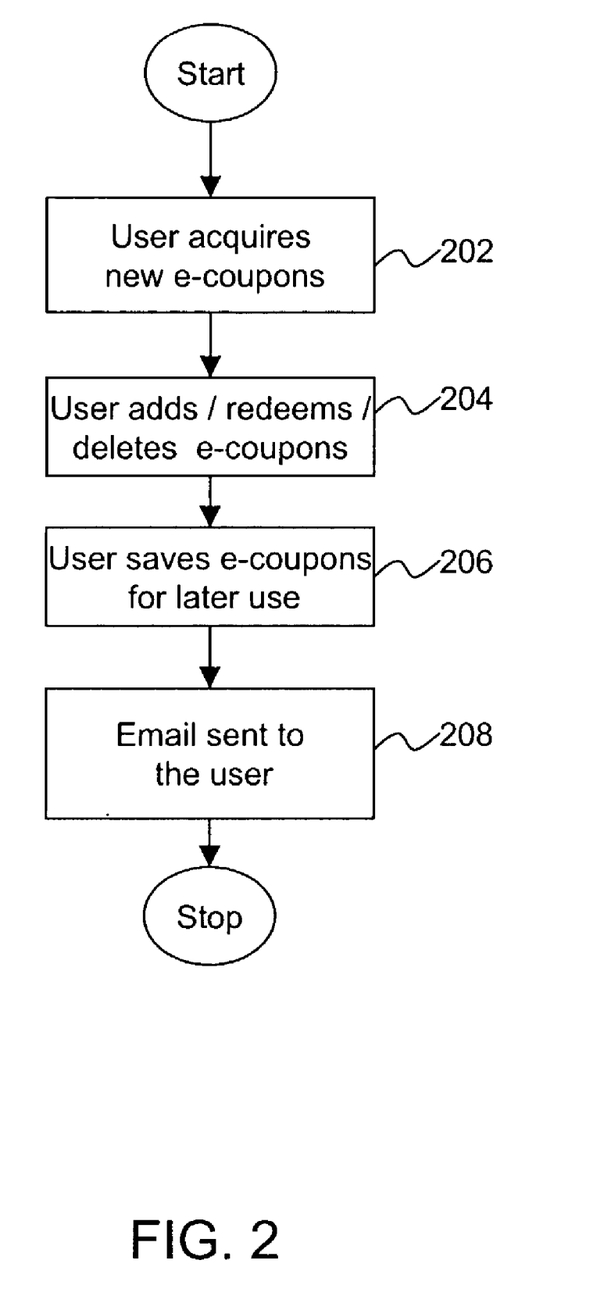
FIG. 2 is an overview of the steps followed when the user visits the e-commerce web site for the first time, in accordance with a preferred embodiment of the current invention.

FIG. 2 is an overview of the steps followed when a user visits an e-commerce web site for the first time, in accordance with a preferred embodiment of the current invention. Electronic coupons are displayed to the user on the website as clickable graphic or text having an associated item link, over the communication network. The user may choose to acquire the displayed electronic coupons by clicking on the respective item on the website, at step 202. When the user clicks the coupon link, the web browser is redirected to the webserver, which then associates the coupon to the user.

The user may add more coupons or may delete or redeem existing coupons to his/her e-coupon wallet at step 204. Once the user desires to end the browsing session, the user is provided an option of saving all the selection of coupons for later use at step 206. In case the user wants to save those coupons, the user is prompted for an email address. An email is sent to the user at the provided email address at step 208. The email contains a URL containing an embedded code, which may be used to access coupons the user has saved in the previous session. The user can access the coupons saved from this session, by visiting the URL. Once the user clicks the URL, he/she is directly taken to the e-commerce website. The information embedded in the URL is used to retrieve details of electronic coupons saved in the previous browsing session. In this manner, the user is able to maintain the selected coupons across multiple browsing sessions, without registering onto the e-commerce website.

Figure 3:
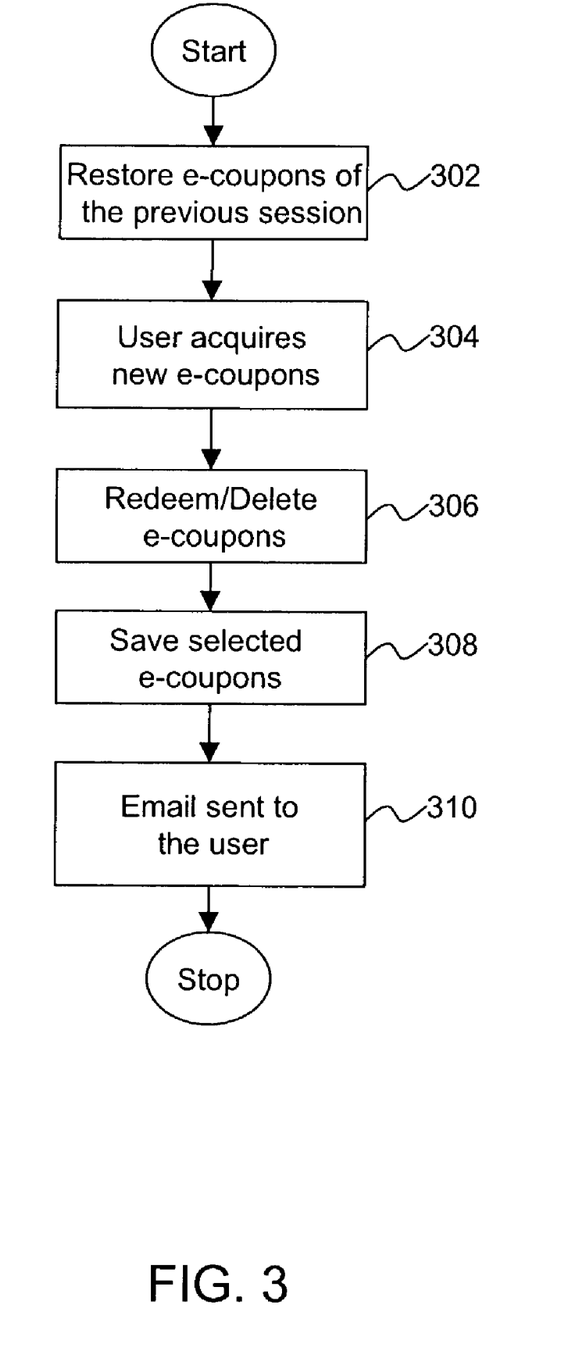
FIG. 3 gives an overview of the steps followed when the user wishes to access the coupons pertaining to a previous browsing session.

FIG. 3 gives an overview of the steps followed when the user wishes to access the electronic coupons pertaining to a previous browsing session. The user clicks the URL e-mailed to him/her at the end of the previous browsing session. On clicking the URL at step 302, his/her earlier wallet and coupons are restored. All coupons that were saved during the previous browsing session are presented to the user. Thereafter, the browsing session proceeds as usual. The user can redeem any of the coupons saved during the previous browsing session. Also, the user is presented with new electronic coupons as banner advertisements. The user may add new coupons to his/her e-coupon wallet by clicking on the banners at step 304. The user can delete or redeem any of the new coupons or the coupons saved during the previous session at step 306. Thereafter, the user is provided the option of saving all coupons in the wallet for later use at step 308. Finally, an email containing a URL is sent to the user at step 310 at the user's email address. The user is not prompted to enter his/her email address again as the email address is saved from the previous session. The URL can be used to access coupons saved in this session in future. In this manner, the electronic coupons are retained across multiple browsing sessions, without the user having to register onto the e-commerce website.

In a preferred embodiment of the invention, the email address of the user is embedded in the URL. Details corresponding to the selection of items made by the user are mapped against the email address and stored in a database. When the user clicks the URL received in the email, the embedded email address is extracted from the URL. This email address is thereafter used to extract the details of the items (stored in the e-commerce site) selected by the user in the previous browsing sessions. In this case, while saving the coupons again, the user will not be required to enter his/her email address in subsequent browsing session. This is because e-mail address is already embedded in the code, which was decrypted by the website. In another embodiment of the current invention, in addition to e-mail ID, the details pertaining to the selected items (such as coupon ID) can be embedded in the URL.

Figure 4A:
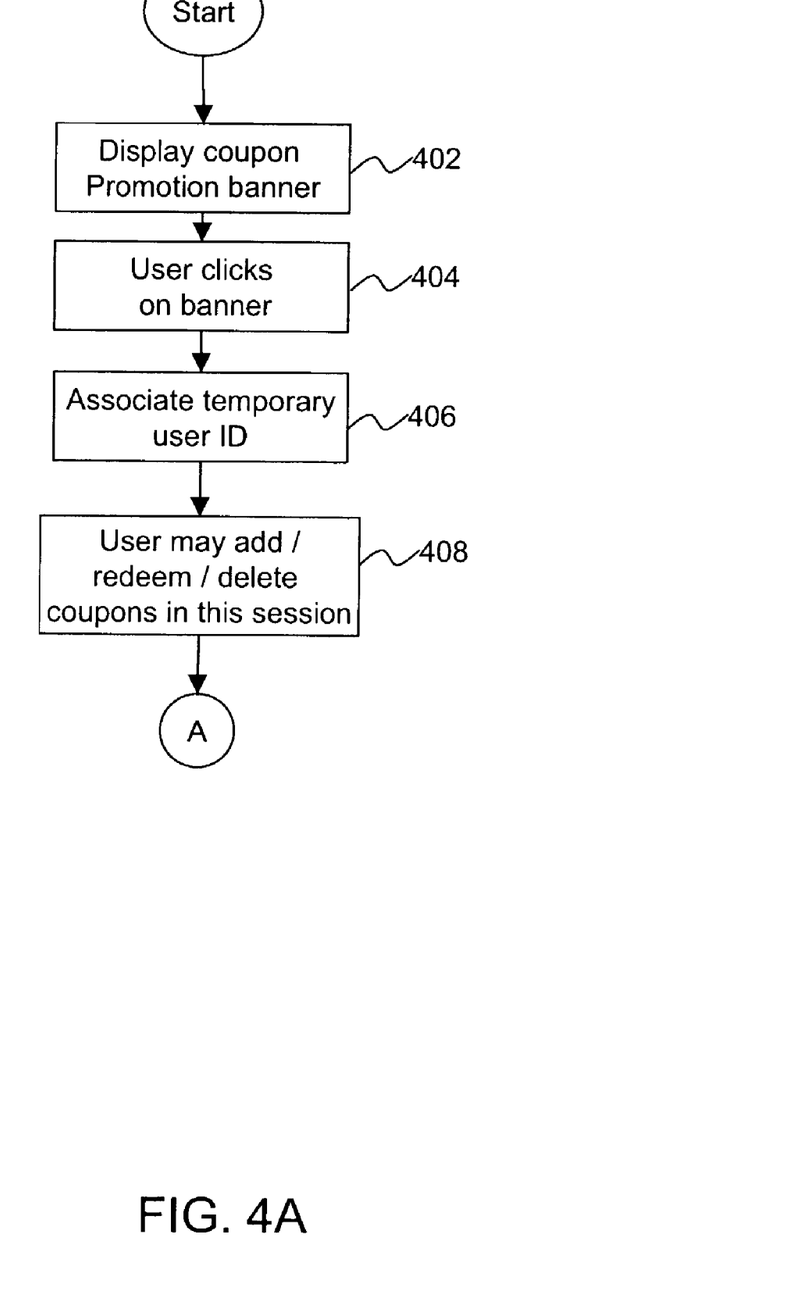
FIGS. 4A and 4B show the steps of flowchart as illustrated in FIG. 2, in greater detail.
Figure 4B:
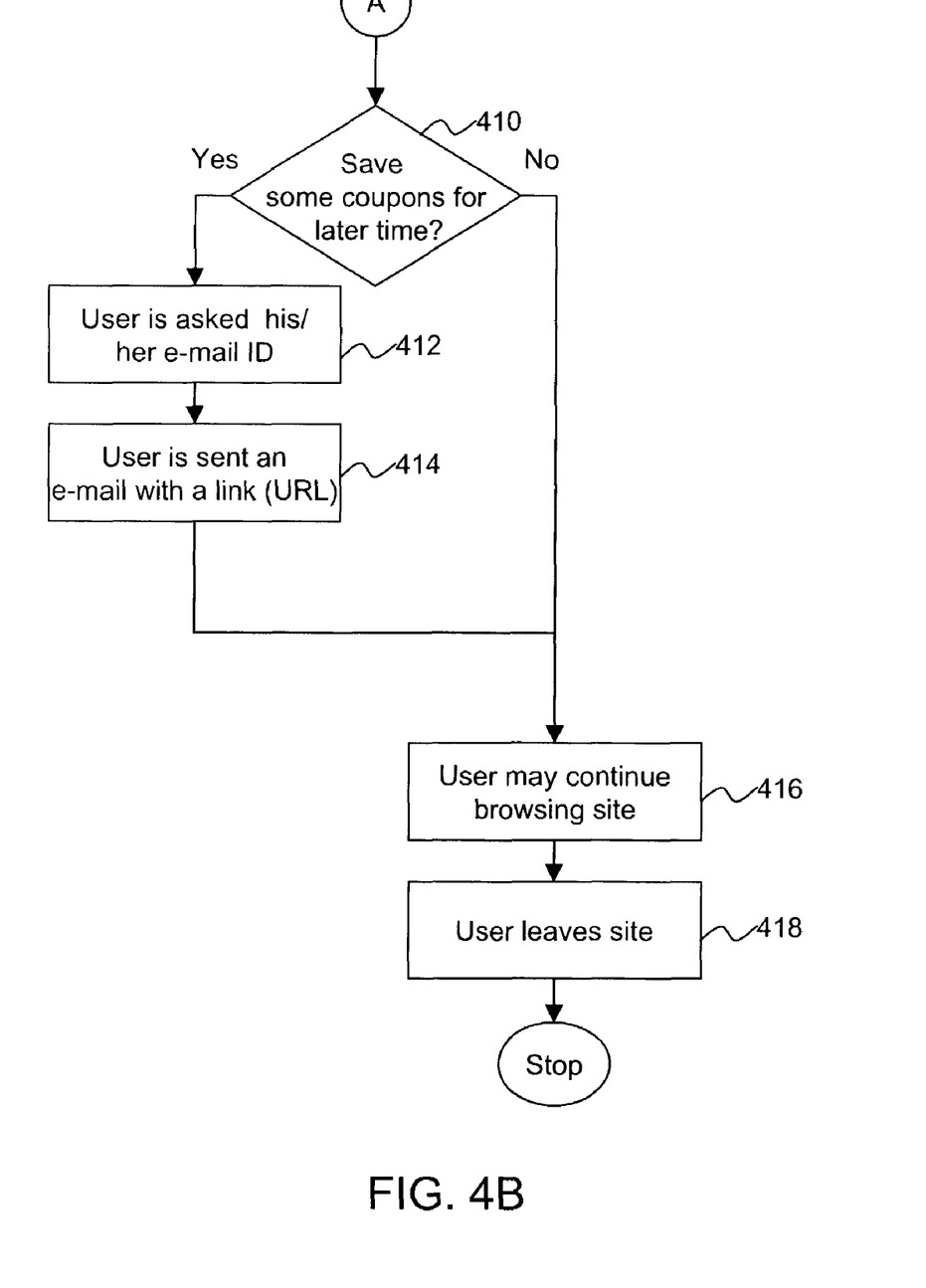

Referring now to FIG. 4, the invention is discussed in greater detail. FIG. 4 discusses the scenario when the user visits the e-commerce website for the first time. The user is shown banner advertisements offering electronic coupons on various items, at step 402. The user can accept the coupons by clicking on the respective banner, at step 404. On clicking a banner for the first time during a browsing session, the e-commerce website creates a unique temporary 'user ID' for the user, at step 406. The user ID keeps track of the user using cookies, for the duration of the browsing session. The cookies reside on client computer 104 that the user uses to browse the e-commerce site. Details regarding the transaction, such as the user ID, coupons accessed etc., can be put on cookies, so that the e-commerce site can directly read the cookie information to identify the users. In an alternative embodiment, other session tracking mechanisms such as hidden form fields, URL rewriting etc. can also be used, instead of cookies, for tracking the visitors.

All coupons accepted by the user are mapped to the user ID. The term 'mapping' here refers to storing the user ID and accepted coupons corresponding to the user ID, in a database located in the website. The mapping can be viewed as creation of an "electronic coupons wallet" for the user ID. Electronic coupon wallet is a software tool that enables a user to review and store his/her electronic coupons. One such electronic coupon wallet is described in the reference "Sales Promotions on the Internet", M. Kumar, A. Rangachari, A. Jhingran and R. Mohan, Third USENIX workshop on electronic Commerce, Boston, 31 Aug-3 Sep. 1998. The wallet can be provided by an e-commerce website (providing the e-coupons) or by third party service provider. Thus, for a particular session, the website can use electronic wallet to store coupons and offer additional features. Once the user has saved his/her coupons and the browsing session has ended, the existing coupon wallet, user ID and the unsaved coupons can be deleted from the server. If the user wishes to retrieve the saved coupons (through a code sent to his e-mail) at a later session, the website can create a new temporary ID for the session and invoke a fresh e-coupon wallet. The restored coupons can then be mapped to new temporary ID and e-coupon wallet software. In this manner, the e-coupon wallet is persisted across sessions for a user.

The mapping of coupons to the user ID helps in identifying the coupons accepted/deleted for a specific user ID, during a browsing session. The electronic coupon wallet functionality can be implemented at the client side or at the server on the e-commerce site or even at the server on a third party service provider site. The user can either add coupons to his wallet, or redeem coupons for a particular product, or delete coupons from his wallet during the browsing session at step 408. The wallet also allows the user to view existing coupons.

During or at the end of a session, the user can optionally save some or all electronic coupons for use in a future session, at step 410. In case the user opts to save the coupons, he/she is asked for an e-mail address at step 412. The coupons to be saved are mapped to the e-mail ID, and a code is generated which contains details about the e-mail ID. The code may be in an encrypted format, for security purposes. For the purpose of encryption, various encryption algorithms such as RSA, DES etc. can be used. In another embodiment, the code may contain the e-mail address of the user and the saved coupon IDs in an encrypted format. An example of the URL code e-mailed to the user is:

"http://www.website.com/Encrypted_code"

Here, the Encrypted code contains email address of the user. An e-mail is then sent to the user at step 414, containing a URL of the site where the coupons can be accessed, and the code, which can be used to recover saved coupons of earlier session. The user may continue browsing the site at step 416, or may end the session by leaving the site at step 418.

It may be noted here that the coupons saved for later use are associated with an e-mail address. This is different from existing techniques where coupons are associated with temporary user ID that is valid only for the duration of the session. Since the e-mail address is permanent, coupons associated with the email address do not get purged after the session is over. Thus, the coupons are maintained across different sessions. The association of coupons to e-mail ID is used by the server to identify which coupons are assigned to which users. The association is stored in a database in the e-commerce site, providing the e-coupons. An example of the association could be database tables where various fields such as e-mail address, coupon IDs, expiry date, manufacturer name, product name, discount value etc. may be stored. By providing any one of the fields in the standard query (in standard query language such as SQL), other details could be accessed. For e.g. by using the coupon ID, the server can extract other details about the coupon.

Figure 5A:
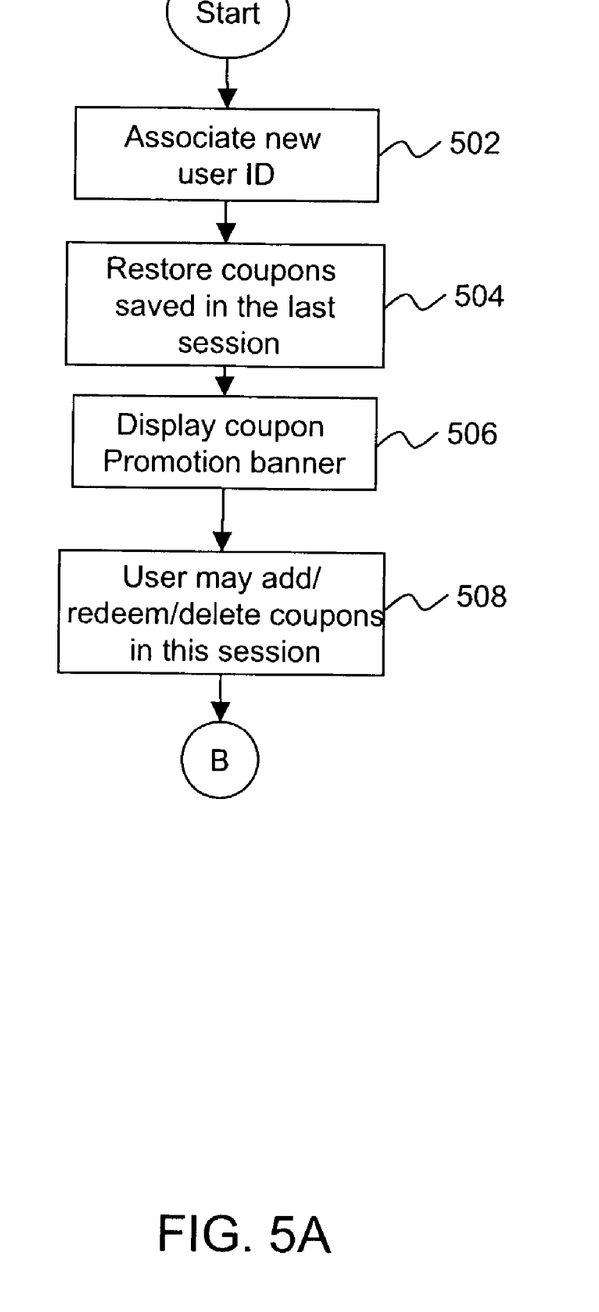
FIGS. 5A and 5B show the steps of flowchart as illustrated in FIG. 3, in greater detail.
Figure 5B:
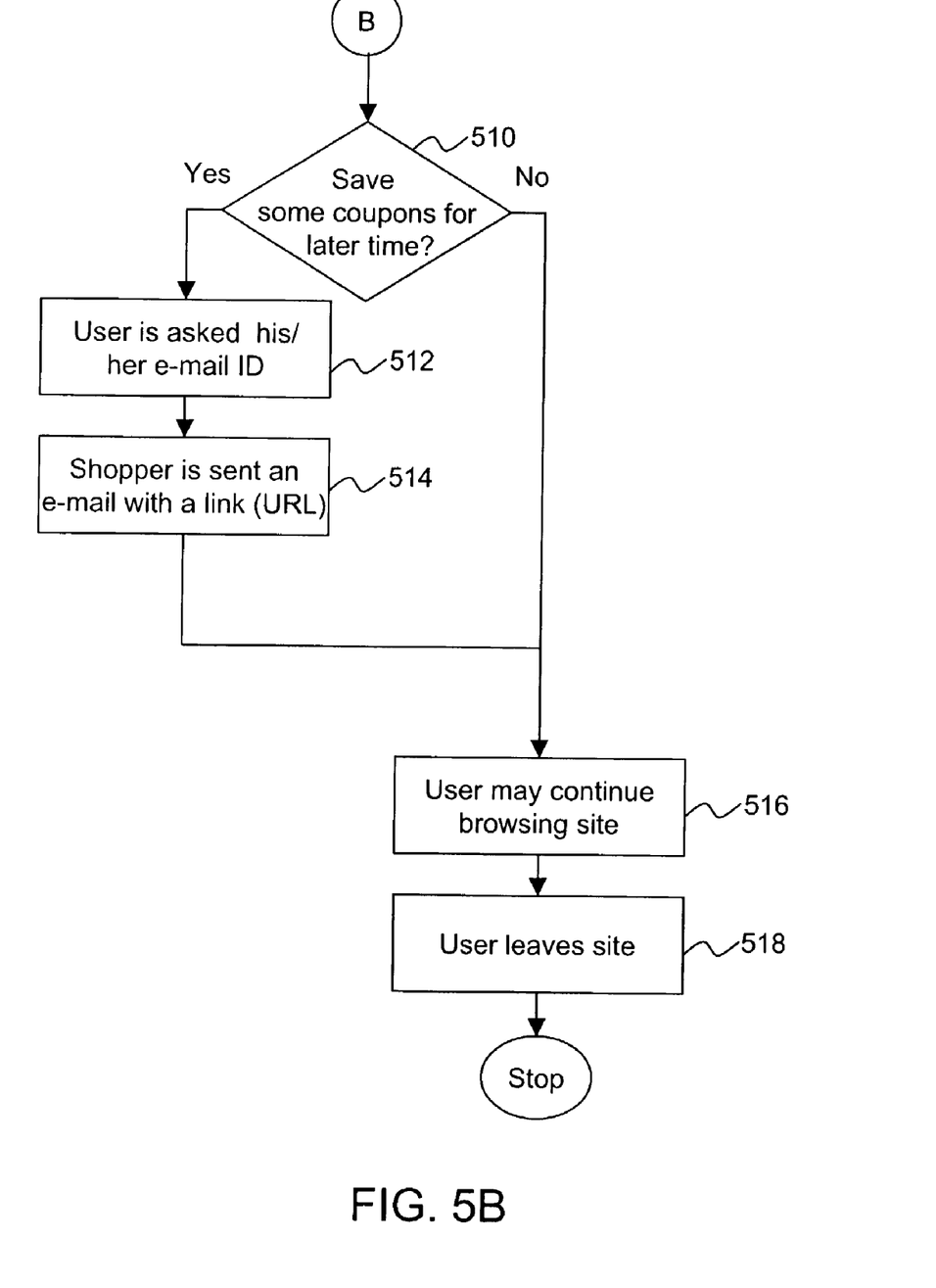

If the user wishes to access his/her earlier saved coupons, he/she can use the code sent to their e-mail address at the time of saving. This process is illustrated in FIG. 5. If the e-mail is HTML enabled, the user can directly click on the URL code to access the coupons. Otherwise the user can copy the URL code on the browser address bar to access the saved coupons. When the user clicks on the URL code, he/she is directed to the relevant site. The site then associates a new temporary user ID and invokes a fresh e-coupon wallet, at step 502, for the duration of the new session. In case, the code contains e-mail address only, then the e-commerce site can decrypt the code to obtain e-mail address. Otherwise, in case where the code contains coupon IDs also, the e-commerce site decrypts the code (appended in the URL), to extract email id and/or saved coupon IDs. The site can then use e-mail address (or coupon IDs) to extract coupon details from the server (the mapping between e-mail address and coupons being stored on the server). The e-commerce site then associates the extracted coupons to the new user ID and e-coupon wallet at step 504. In this manner, the user can get back his saved coupons and wallet. The user may be shown various coupon banners at step 506. Users can add new electronic coupons to their wallet by clicking on the banners. Users can also view, add or delete existing coupons at step 508 in the same way as described in FIG. 4. During or at the end of a session, the user can optionally save some or all coupons, for use in a future session, at step 510. In case the user opts to save the coupons, he/she is asked for his/her e-mail address at step 512. The coupons to be saved are mapped to the e-mail address, and a code is generated which contains details about the e-mail ID and the saved coupons. The code may be in an encrypted format, for security purposes. An e-mail is then sent to the user at step 514, containing a URL of the site where the coupons can be accessed, and the code, which can be used to recover saved coupons of earlier session. The user may then continue browsing the site at step 516, or may end the session by leaving the site at step 518.

Thus the current invention preserves the electronic coupon wallet across multiple sessions, for unregistered users. An advantage of the current invention is that it helps in accessing the functionality of electronic coupons for unregistered users across multiple browsing sessions. In other words, it eliminates the need for registration, thereby ensuring privacy of users. It also saves the time and effort used in case of registering. The invention also provides the flexibility of choosing which coupons (or items), the user wishes to save. Also, as only the information regarding the selected items is stored on website, a large amount of space is not required, thereby saving storage space on the website.

In another embodiment of the current invention, registered users who have logged in are also offered the functionality of saving coupons for later use using the mechanism as discussed above.

In another embodiment of the invention, the electronic coupons can be offered to the user through e-mail. In order to accept these coupons, the user can click on the coupons itself, or may visit the site mentioned in the e-mail. The web site can then create a new temporary ID for the user and associate the coupons with this ID. The user can add/view/delete or save coupons in the same manner as described in FIG. 5.

Although the invention has been described in terms of managing electronic coupons, it is not limited for use with electronic coupons alone. Other details concerning an unregistered user such as shopping cart content, website customization, gift certificates received etc. can also be preserved across multiple browsing sessions using the current invention.

In an alternative embodiment, the invention can be applied to preserving shopping cart content for unregistered users across multiple browsing sessions. In this case, the user can select items to place them in his/her shopping cart. At the end of the session, or even during the session, the user is provided an option of saving his/her shopping cart for future use. In case the user wishes to save the cart for a later session, he/she is prompted for an email address. Thereafter, details identifying the shopping cart content, such as item code, are embedded in a URL, which in turn is sent to the user at the provided email address. The user can simply click the URL whenever he/she wishes to continue with the shopping, in subsequent browsing session. On clicking the URL, the session is restored, in a manner similar to electronic coupons described above. In this manner, even an unregistered user can use a shopping cart that persists across multiple sessions.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method for managing one of an electronic-coupon (e-coupon) and an electronic-gift certificate (e-gift certificate), acquired by a user across multiple browsing sessions at a computerized e-commerce website, without said user registering at said computerized e-commerce website, the method comprising:

acquiring, by said user, said one of an e-coupon and an e-gift certificate during an initial browsing session to said computerized e-commerce website, without said user registering at said computerized e-commerce website;

associating said acquired one of an e-coupon and an e-gift certificate and said user by a computerized e-commerce webserver that provides a computerized e-wallet for said user;

upon ending said initial browsing session, redirecting said user to said computerized e-wallet, using said webserver;

saving, by said user, said acquired one of an e-coupon and an e-gift certificate in said computerized e-wallet;

receiving, by said webserver, from said user, an email address of said user; and sending an email to said user, from said webserver, said email including a coded Universal Resource Locator (URL) that when subsequently used, accesses information related to said saved one of an e-coupon and an e-gift certificate in a subsequent browsing session by said user.

2. The method according to claim 1, further comprising accessing said computerized e-commerce website by said coded URL in said subsequent browsing session; and restoring said information related to said saved one of an e-coupon and an e-gift certificate, from said initial browsing session, to said computerized e-wallet for said subsequent browsing session.

3. The method according to claim 2, further comprising:

acquiring, by said user, another said one of an e-coupon and an e-gift certificate during said subsequent browsing session and associating said acquired another said one of an e-coupon and an e-gift certificate and said user by said computerized e-commerce webserver;

upon ending said subsequent browsing session, redirecting said user to said computerized e-wallet and saving by said user, said acquired another one of an e-coupon and an e-gift certificate in said computerized e-wallet, without registering at said computerized e-commerce website; and sending another email to said user, said another email including a coded URL that accesses information related to any of said saved one of an e-coupon and an e-gift certificate, from said initial browsing session, and said saved another one of an e-coupon and an e-gift certificate, from subsequent browsing session.

4. The method according to claim 3, further comprising deleting, by said user, one of an e-coupon and an e-gift certificate from said computerized e-wallet.

5. The method according to claim 1, wherein the one of an e-coupon and an e-gift certificate is presented to the user in a form of banner advertisements.

6. The method according to claim 1, wherein the sending an e-mail to said user, uses an encryption algorithm to encode details of the one of an e-coupon and an e-gift certificate on the coded URL.

7. A computer-implemented method for managing an item selected for inclusion in an electronic shopping cart (e-shopping cart) across multiple browsing sessions at a computerized e-commerce website, without said user registering at said computerized e-commerce website, the method comprising:

selecting, by said user, said item for inclusion in said e-shopping cart during an initial browsing session to said computerized e-commerce website, without said user registering at said computerized e-commerce website;

associating said selected item and said user by a computerized e-commerce webserver that provides said e-shopping cart at said computerized e-commerce website for said user;

upon ending said initial browsing session, redirecting said user to said e-shopping cart, using said webserver;

saving, by said user, said acquired item in said e-shopping cart;

receiving, by said webserver, from said user, an email address of said user; and sending an email to said user, from said webserver, said email including a coded Universal Resource Locator (URL) that when subsequently used, accesses information related to said saved item in a subsequent browsing session by said user.

8. The method according to claim 7, further comprising:

accessing said computerized e-commerce website by said coded URL in said subsequent browsing session; and restoring said information related to said saved item, from said initial browsing session, to said e-shopping cart for said subsequent browsing session.

9. The method according to claim 8, further comprising:

acquiring, by said user, another item for inclusion in said e-shopping cart during said subsequent browsing session and associating said acquired item and said user by said computerized e-commerce webserver;

upon ending said subsequent browsing session, redirecting said user to said e-shopping cart and saving by said user, said acquired another item in said e-shopping cart, without registering at said computerized e-commerce website; and sending another email to said user, said another email including a coded URL that accesses information related to any of said saved item, from said initial browsing session, and said saved another item, from said subsequent browsing session.

10. A computer program storage medium readable by computer, tangibly embodying a program of instructions executable by said computer to perform a method for managing one of an electronic-coupon (e-coupon) and an electronic-gift certificate (e-gift certificate), acquired by a user across multiple browsing sessions at a computerized e-commerce website, without said user registering at said computerized e-commerce website, the method comprising:

acquiring, by said user, said one of an e-coupon and an e-gift certificate during an initial browsing session to said computerized e-commerce website, without said user registering at said computerized e-commerce website;

associating said acquired one of an e-coupon and an e-gift certificate and said user by an e-commerce webserver that provides an e-wallet for said user;

upon ending said initial browsing session, redirecting said user to said e-wallet, using said webserver;

saving, by said user, said acquired one of an e-coupon and an e-gift certificate in said e-wallet;

receiving, by said webserver, from said user, an email address of said user; and sending an email to said user, from said webserver, said email including a coded Universal Resource Locator (URL) that when subsequently used, accesses information related to said saved one of an e-coupon and an e-gift certificate in a subsequent browsing session by said user.

11. A computer program storage medium readable by a computer, tangibly embodying a program of instructions executable by said machine to perform a method for managing one of an electronic-coupon (e-coupon) and an electronic-gift certificate (e-gift certificate), acquired by a user across multiple browsing sessions at a computerized e-commerce website, without said user registering at said computerized e-commerce website, the method comprising:

selecting, by said user, said item for inclusion in said e-shopping cart during an initial browsing session to said computerized e-commerce website, without said user registering at said computerized e-commerce website;

associating said selected item and said user by an e-commerce webserver that provides said e-shopping cart at said computerized e-commerce website for said user;

upon ending said initial browsing session, redirecting said user to said e-shopping cart, using said webserver;

saving, by said user, said acquired item in said e-shopping cart;

receiving, by said webserver, from said user, an email address of said user; and sending an email to said user, from said webserver, said email including a coded Universal Resource Locator (URL) that when subsequently used, accesses information related to said saved item in a subsequent browsing session by said user.

12. The method according to claim 9, further comprising deleting, by said user, an item from said e-shopping cart.

* * * * *